US006420802B1

(12) United States Patent
Einhorn et al.

(10) Patent No.: US 6,420,802 B1
(45) Date of Patent: Jul. 16, 2002

(54) HYDRAULIC WINCH LIMIT SWITCH CIRCUIT

(75) Inventors: Michael Einhorn; Ian Stewart, both of Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 24 days.

(21) Appl. No.: 09/606,226

(22) Filed: Jun. 27, 2000

(51) Int. Cl.[7] .................................................. H02J 4/00

(52) U.S. Cl. ...................................... 307/119; 307/326

(58) Field of Search ................................ 307/119, 326, 307/116

(56) References Cited

U.S. PATENT DOCUMENTS 4,888,537 A * 12/1989 Appel et al. ................ 318/626
4,914,362 A * 4/1990 Onishi ........................ 318/266
5,522,568 A * 6/1996 Kamen et al. ........... 244/17.13
6,259,175 B1 * 7/2001 Alfano et al. ................. 310/20

* cited by examiner

*Primary Examiner*—Fritz Fleming
(74) *Attorney, Agent, or Firm*—David Kalmbaugh

(57) ABSTRACT

A hydraulic winch limit switch circuit for preventing a winch cable from moving beyond its normal stop position which insures that the winch cable and research equipment attached to the cable are not damaged. The circuit includes a single pole limit switch with a diode connected across the contact of the limit switch. In normal operation the limit switch is closed and current flow is through switch to a winch electronic displacement controller which controls the operation of the winch motor and the winch. When the winch reaches a stop position during payin of the winch cable, the limit switch opens as the result of the limit switch arm engaging a tow bar attached to the end of the winch cable. opening the limit switch stops current flow through the winch electronic displacement controller since the diode is reversed biased during payin of the winch cable. This de-energizes the winch motor which results preventing the winch cable from moving beyond its normal stop position. When there is payout of the winch cable, the diode is forward biased resulting in current flow through the diode to the winch electronic displacement controller which energizes the winch motor allowing for deployment of the winch cable.

3 Claims, 3 Drawing Sheets

HYDRAULIC WINCH LIMIT SWITCH CIRCUIT

BACKGROUND OF THE INVENTION

1. Field of the Invention

The present invention relates generally to an electrical circuit for controlling a hydraulic winch used on an ocean going vessel. More particularly, the present invention relates to an electrical circuit which controls the operation of a hydraulic winch to prevent damage to the winch when the winch is being used to retrieve a winch cable.

2. Description of the Prior Art

Ocean going vessels, such as ships, barges and the like, routinely use hydraulic winches to retrieve tow or winch cables which have electrical equipment such as transducers, acoustic sensors, non acoustic sensor, etc. attached thereto. When a winch cable is being retrieved using a hydraulic winch damage will often occur to the equipment if the winch and thus cable are not stopped in time by an operator. Generally, the operator cannot be relied upon to prevent damage since at the end of travel of the cable, a very small movement of the winch drum can cause an overrun of the cable beyond its normal stop position resulting in damage to the cable and the equipment attached thereto.

Presently, to prevent the winch cable from moving beyond its normal stop position (causing damage to equipment and the winch cable) a limit switch control circuit 9 of the type illustrated in FIG. 1 is being utilized. The circuit 9 of FIG. 1 includes a limit switch 10 and a complex electronics circuit 12. The limit switch 10 is positioned so that its contact opens when a tow bar located at the end of the winch cable engages the limit switch 10 opening limit switch 10. When the limit switch 10 opens, the electronics b) circuit 12 turns off current flow to a winch electronic displacement controller 14 which stops the winch.

The electronics circuit 12 includes relays, comparators and other electrical components to de-energize the displacement controller 14. The electrical components of electronics circuit 12, however, are subject to failure which could result in substantial damage to the winch, the tow line and the electrical component attached to the tow line. In addition, the electronics circuit 12 is expensive resulting in substantial cost to the user when any of the electrical components of circuit 12 fail.

Accordingly, there is a need for a highly reliable yet relatively inexpensive circuit for de-energizing the winch electronic displacement controller to prevent the winch cable from moving beyond its normal stop position.

SUMMARY OF THE INVENTION

The hydraulic winch limit switch circuit of the present invention overcomes some of the difficulties of the prior art including those mentioned above in that it is a very simple, yet highly effective circuit for preventing a winch cable from moving beyond its normal stop position which insures that the winch cable and research equipment attached to the cable are not damaged.

The present invention is a relatively simple circuit which includes a single pole limit switch with a diode connected across the contact of the limit switch. In normal operation the limit switch is closed and current flow is through switch to a winch electronic displacement controller which controls the operation of the winch motor and the winch. When the winch reaches a stop position during payin of the winch cable, the limit switch opens as the result of the limit switch arm engaging a tow bar attached to the end of the winch cable. Opening the limit switch stops current flow through the winch electronic displacement controller since the diode is reversed biased during payin of the winch cable. This de-energizes the winch motor preventing the winch cable from moving beyond its normal stop position.

When there is payout of the winch cable, the diode is forward biased resulting in current flow through the diode to the winch electronic displacement controller which energizes the winch motor allowing for deployment of the winch cable.

DETAILED DESCRIPTION OF THE PREFERRED EMBODIMENT

Figure 3:
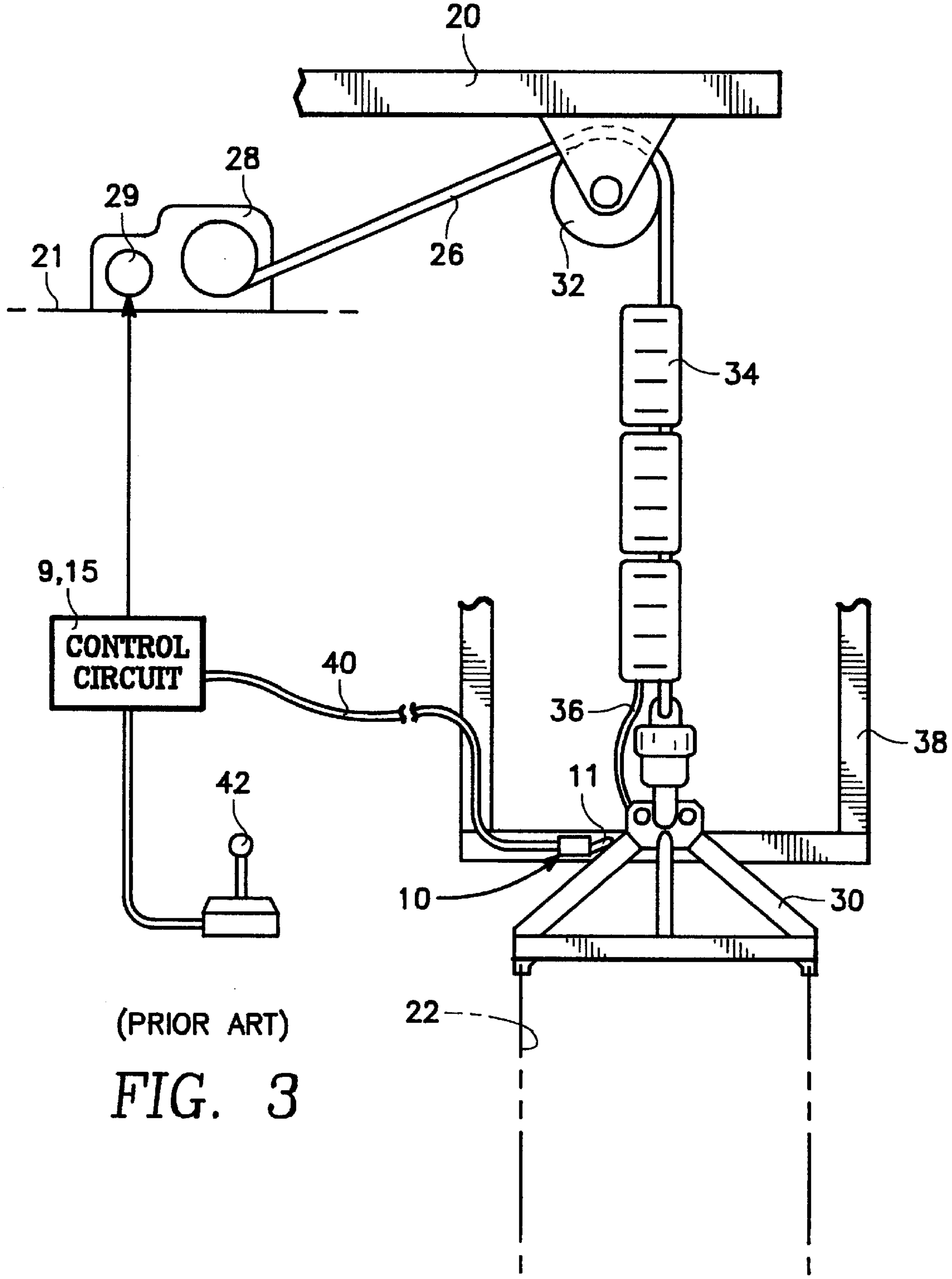
(PRIOR ART) FIG. 3
FIG. 3 is a schematic drawing depicting the winch cable, the limit switch and the winch support structure with which the hydraulic winch limit switch circuit of the present invention is used.

Referring to FIG. 3, there is shown a gantry 20 mounted on the deck 21 of an ocean going vessel which allows for the deployment of a body 22 from the vessel's stern into the water. Body 22, which is suspended from a winch cable 26, may be research equipment such as a towable sonar transducer and may weigh as much as 8,000 pounds.

There is also mounted on deck 21 of the ocean going vessel at its stern is a winch 28 having a winch motor 29. Winch 28 has one end of cable 26 wrapped around winch 28, while the opposite end of cable 26 terminates at a tow bar 30.

A sheave 32 is rotatably coupled to gantry 20. Sheave 32 includes a groove which engages cable 26. The combination of winch 28, winch motor 29 and sheave 32 is used to deploy and retrieve the tow cable 26, tow bar 30 and the research equipment 22 attached to winch cable 26, as well as an umbilical fairing 34. Umbilical fairing 34 includes an umbilical cable 36 which is used to provide electrical power to array modules within research equipment 22.

A support member 38 attached to gantry 20 extends vertically downward from gantry 20. Mounted on support member 38 is limit switch 10 which has an arm 11. Limit switch 10 is electrically connected to control circuit 9 by an electrical cable 40. A winch joy stick 42 is also connected to control circuit 9 by an electrical cable. Winch joy stick 42 is used to control the operation of winch electronic displacement controller 14 (FIG. 1).

Figure 1:
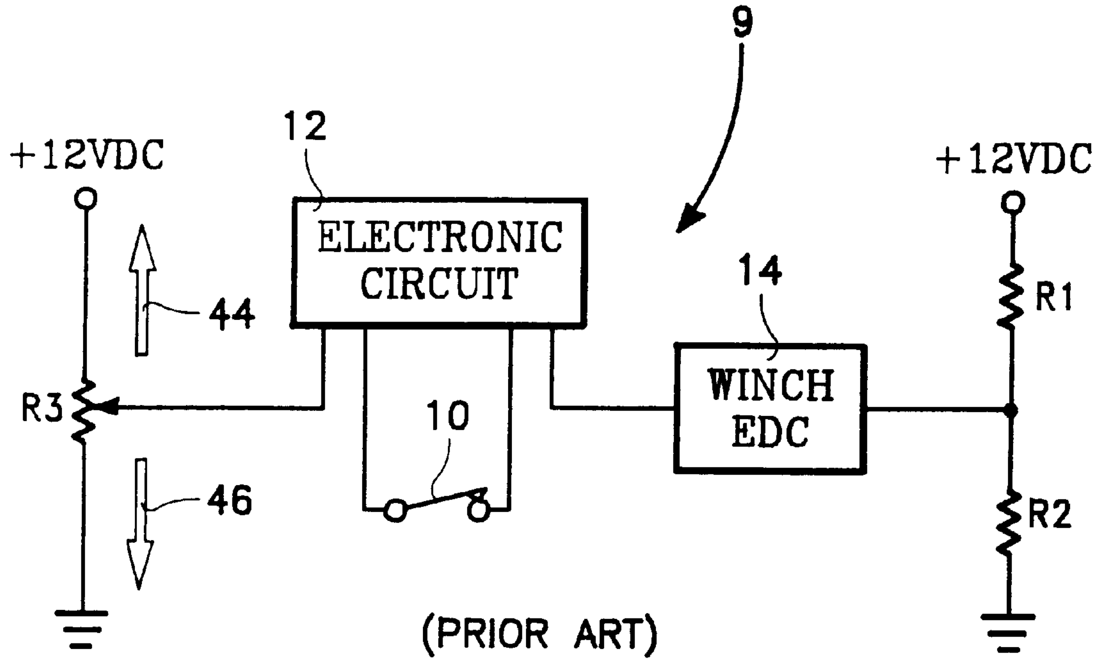
(PRIOR ART) FIG. 1
FIG. 1 is an electrical circuit diagram of the hydraulic winch limit switch circuit used in the past to control the operation of a hydraulic winch and to prevent damage to the winch when the winch is being used to retrieve cable.

Referring now to FIGS. 1 and 3, the prior art winch control circuit 9 operates by supplying a variable DC current to the winch electronic displacement controller 14. One terminal of winch electronic displacement controller 14 is connected to a voltage divider comprising resistors R1 and R2 on the winch joy stick 42, while the other terminal of controller 14 is connected to a potentiometer or variable resistor R3 also on the winch joy stick 42. As the user moves joy stick 42 the current through winch electronic displacement controller 14 is varied in both magnitude and direction (by moving the tap of variable resistor R3) corresponding to variable speed in payout direction (indicated by arrow 44) and payin direction (indicated by arrow 46) of the winch 28.

Figure 4:
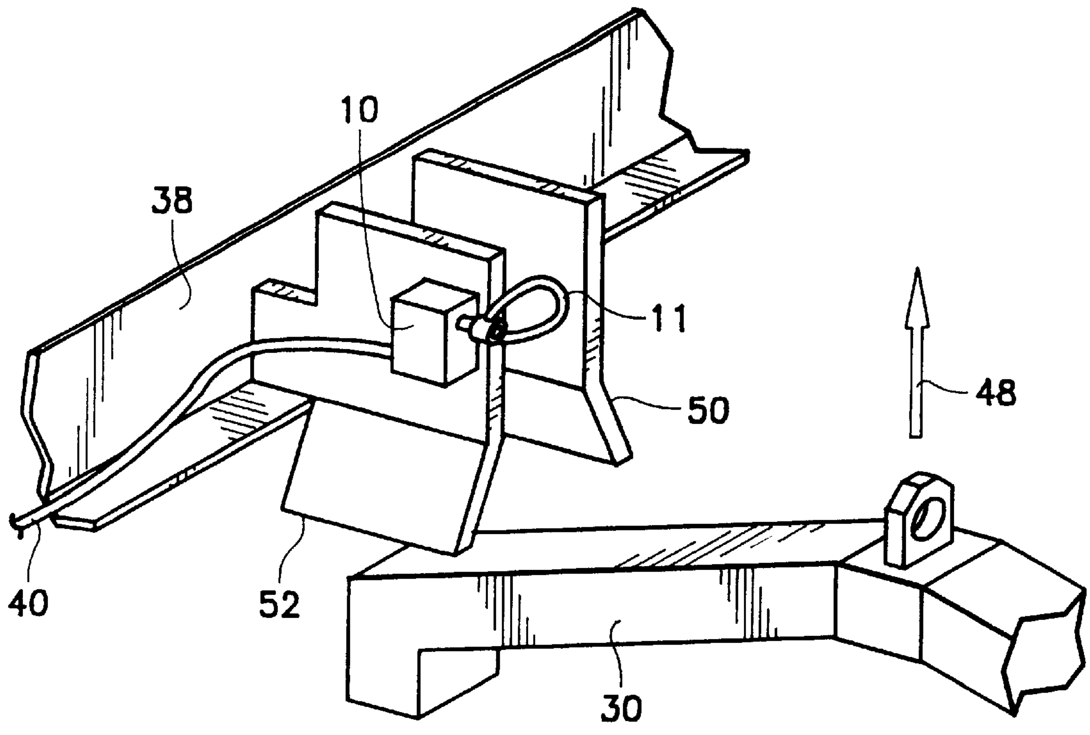
FIGS. 4 and 5 are perspective views illustrating the limit switch arm engaging the tow bar at the end of the winch cable when the winch cable is being retrieved by the winch.
Figure 5:
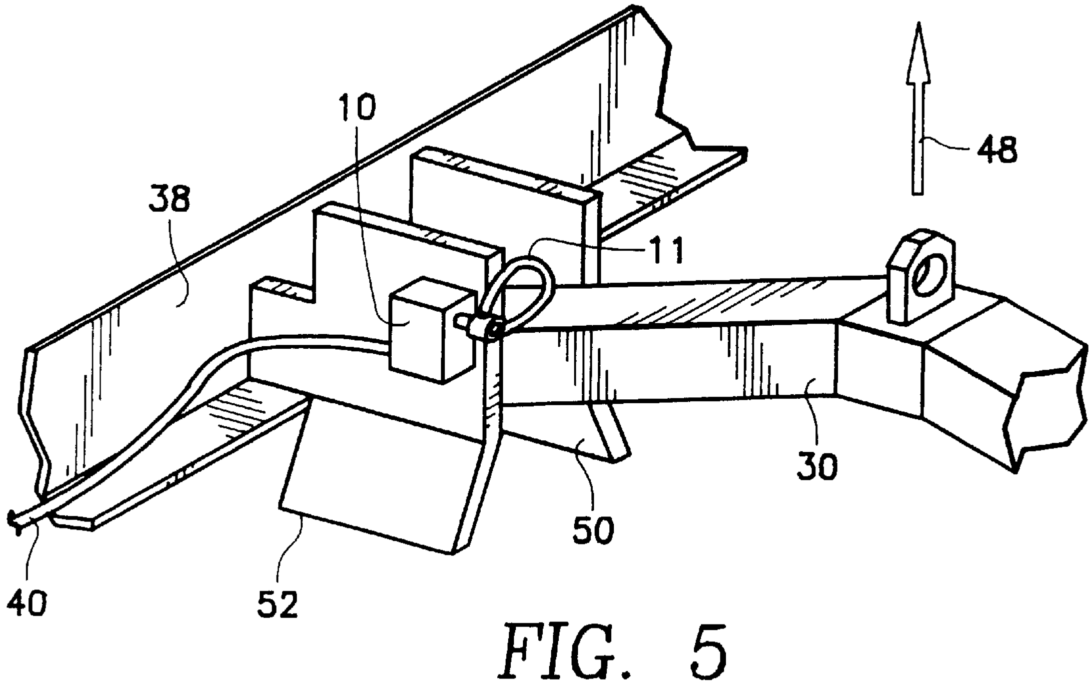

To prevent the winch cable 26 from moving beyond its final retracted payin or stop position, limit switch circuit 9 was employed. The limit switch circuit 9 consists of complex electronic circuit 12 and limit switch 10. As is best seen in FIGS. 4 and 5, limit switch 10 is positioned so that the contact of limit switch 10 opens when tow bar 30 at the end of cable 26 presses against the arm 11 of limit switch 10 in the manner illustrated in FIG. 5.

Both the fixed voltage from resistors RI and R2 and the variable voltage from potentiometer R3 are read into and compared by electronics circuit 12 to determine the direction of the joy stick 42 which may be either in the payout or payin position. When the electronics circuit 12 determined that the joy stick 42 is in the payin direction (winch cable 26 is being retrieved by winch 28) and that the contact of limit switch 10 is open, then a relay in circuit 12 energizes opening a set of relay contacts that interrupt current flow to the winch electronic displacement controller 14 which de-energizes winch motor 29 stopping motion of the winch 28. When the user moves the joy stick 42 in the payout direction, circuit 12 will detect this movement as indicated by arrow 46 and de-energize the relay allowing the relay contacts to close. This results in current flow to the winch electronic displacement controller 14 which energizes winch motor 29 allowing the winch 28 to deploy or payout cable 26.

Figure 2:
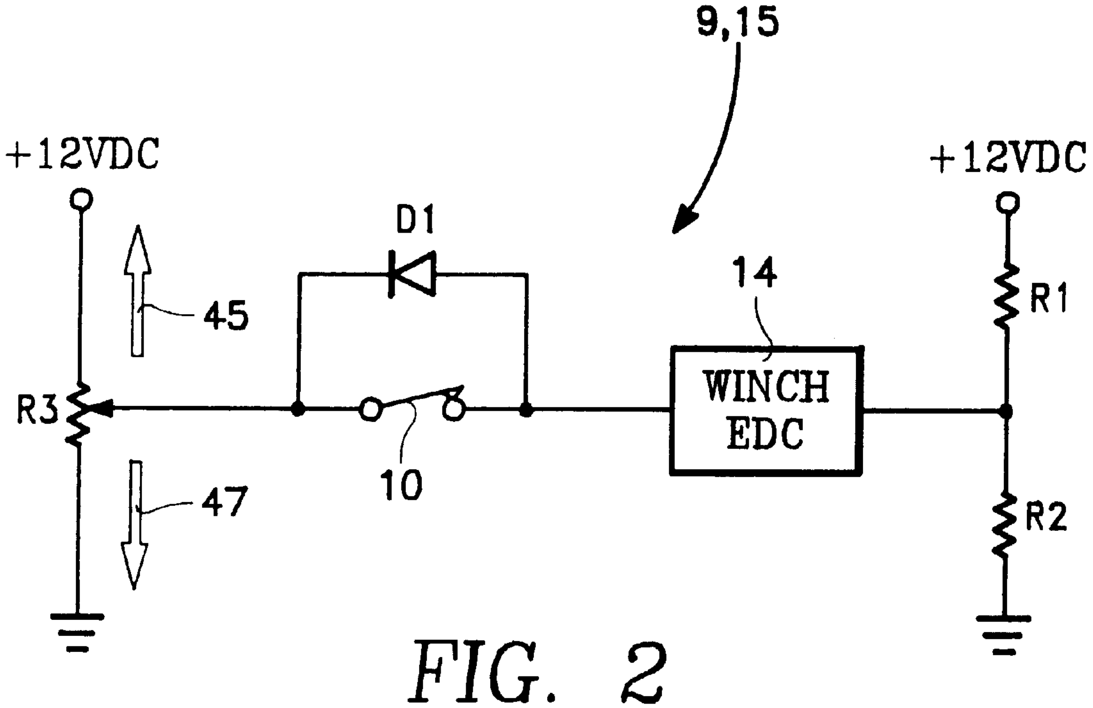
FIG. 2 is an electrical circuit diagram of the hydraulic winch limit switch circuit of the present invention for controlling the operation of a hydraulic winch and to prevent damage to the winch when the winch is being used to retrieve cable.

Referring now to FIGS. 2, 3, 4 and 5, limit switch circuit 15 of FIG. 2 is a relatively simple circuit which includes single pole limit switch 10 with a diode D1 connected across the contact of limit switch 10. In normal operation the contact of limit switch 10 is closed and current flow is through switch 10 to the winch electronic displacement controller 14. When winch 28 reaches the stop position during payin of cable 26, limit switch 10 opens as the result of arm 11 engaging tow bar 30. Opening limit switch 10 stops current flow through the winch electronic displacement controller 14 in the payin direction since diode D1 is reversed biased.

It should be noted that when limit switch 10 is closed, current flow in the payin direction is from the +12VDC power supply through variable resistor R3, limit switch 10, controller 14, and resistor R2 to ground. It should also be noted that even when limit switch 10 is open current flow in the payout direction is through resistor R1, diode D1, controller 14 and variable resistor R3 to ground.

When diode D1 is forward biased, current flow is in the payout direction. This results in winch cable 26 being allowed to move in the payin direction or the payout direction as long as limit switch 10 is closed. Once limit switch 10 is open the diode D1 only allows the winch cable 26 to move in the payout direction.

The diode D1 used in the preferred embodiment is a Model 1N4001 General Purpose Rectifier commercially available from Fairchild Semiconductor of South Portland Maine.

From the foregoing, it may readily be seen that the present invention comprises a new, unique and exceedingly useful hydraulic winch limit switch circuit for use with a hydraulic winch to prevent damage to the winch and winch cable which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A limit switch circuit for preventing damage to a winch and a winch cable by de-energizing a winch electronic displacement unit comprising:

a winch joy stick having a variable voltage source and a fixed voltage source, the fixed voltage source of said winch joy stick being connected to said winch electronic displacement unit;

said variable voltage source including a variable resistor and a direct current voltage source connected to said variable resistor;

said fixed voltage source including a pair of resistors operating as a voltage divider, said direct current voltage source being connected to a first resistor of said pair of resistors;

a limit switch having an arm and a normally closed contact, the normally closed contact of said limit switch being connected to the variable voltage source of said winch joy stick and said winch electronic displacement unit; and a diode having a cathode connected to the variable voltage source of said winch joy stick and an anode connected to said winch electronic displacement unit;

said diode having a reverse bias when current flow through said limit switch is from said variable voltage source to said fixed voltage source which occurs when said winch is retrieving said winch cable;

the normally closed contact of said limit switch opening upon the arm of said limit switch engaging a tow bar attached to the end of said winch cable whenever said winch is retrieving said winch cable; and the normally closed contact of said limit switch when opened, and said diode having said reverse bias preventing said current flow to said winch electronic displacement unit de-energizing said winch electronic displacement unit which disables a winch motor of said winch preventing damage to said winch and said winch cable;

said diode having a forward bias when said current flow is from said fixed voltage source to said variable which occurs when said winch is deploying said winch cable, said forward bias of said diode allowing said winch to deploy said winch cable when the normally closed contact of said limit switch is open.

2. The limit switch circuit of claim 1 wherein said diode is a 1N4001 general purpose rectifier.

3. The limit switch circuit of claim 1 wherein said direct current voltage source comprises a +12 VDC power supply connected to said fixed voltage source and said variable voltage source.

* * * * *